Figure 1:
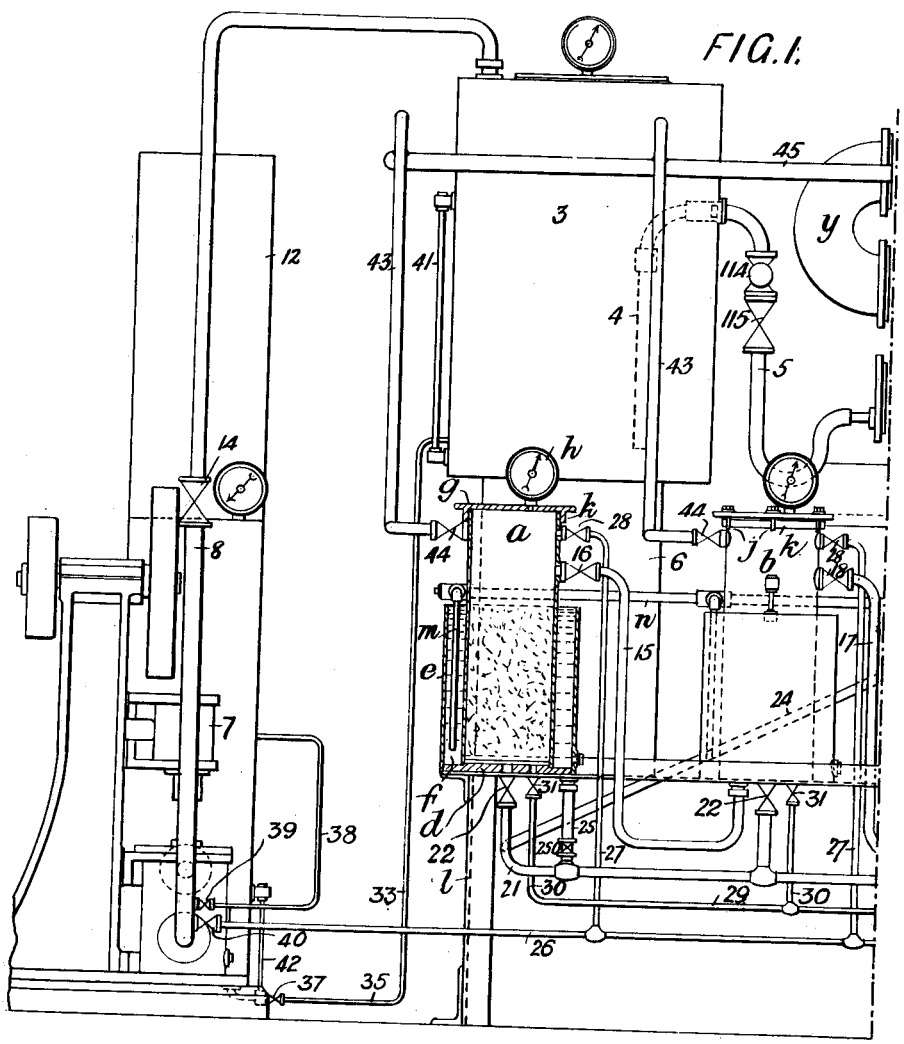

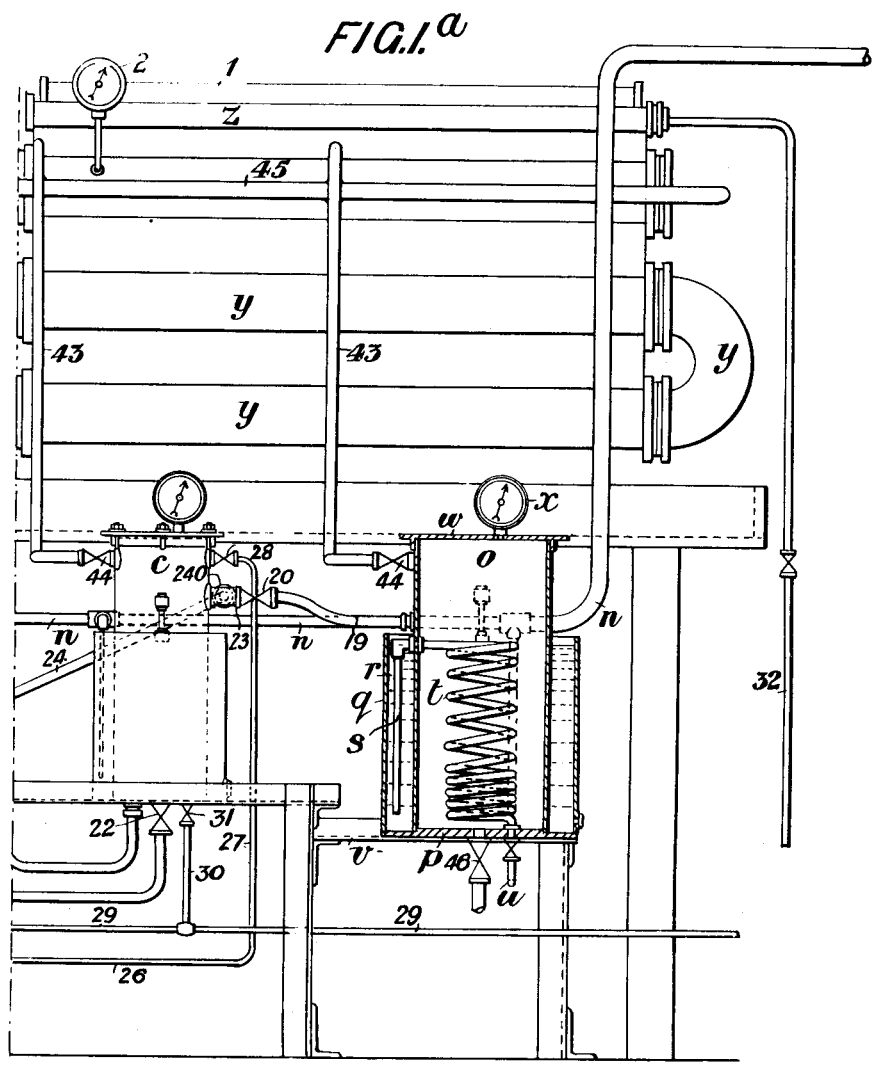

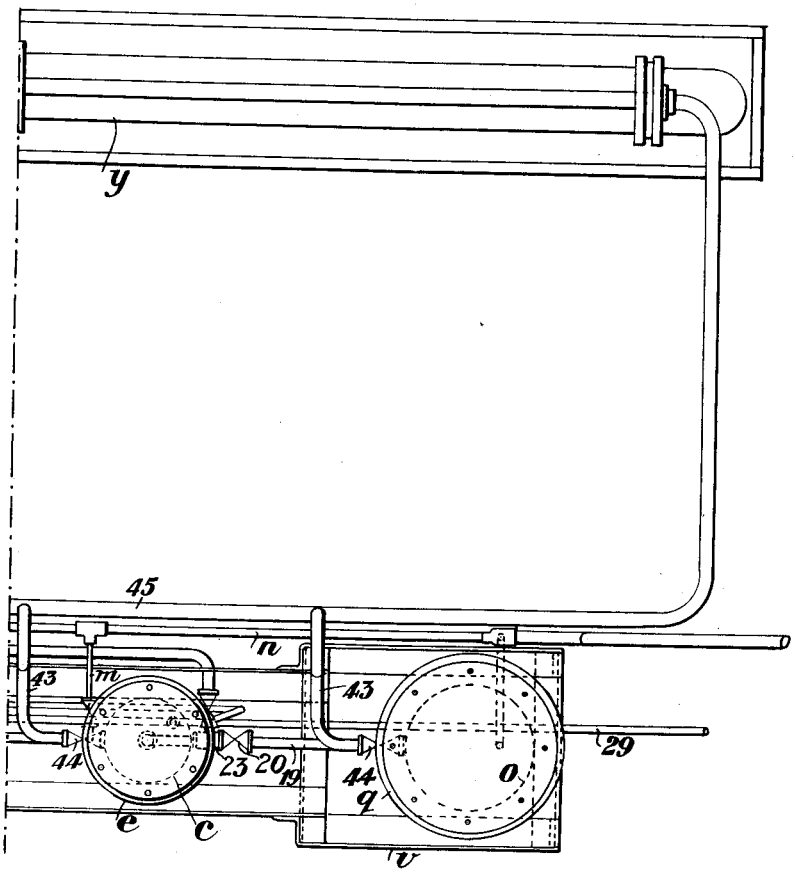

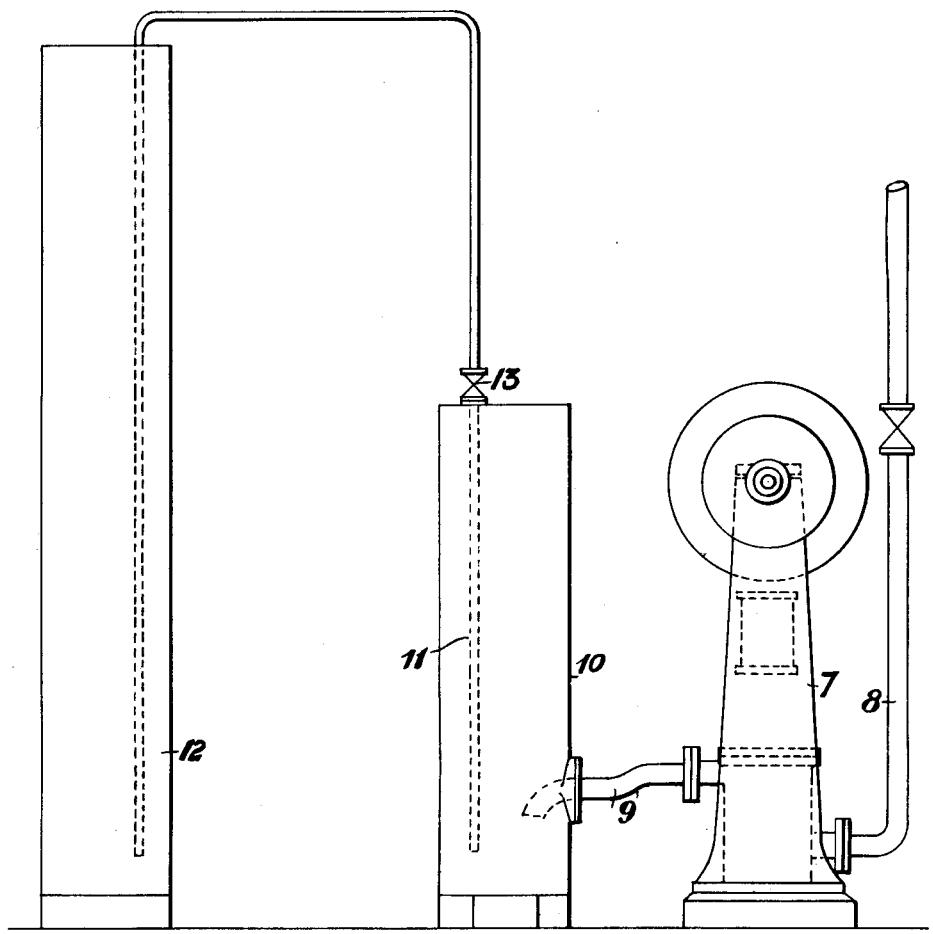

UNITED STATES PATENT OFFICE.

CHARLES ROBERT MAYO, OF LONDON, ENGLAND.

METHOD OF EXTRACTING GREASE FROM GREASE-BEARING MATERIALS.

1,068,354. Specification of Letters Patent. Patented July 22, 1913.

Original application filed April 8, 1910, Serial No. 554,176. Divided and this application filed November 26, 1910. Serial No. 594,314.

*To all whom it may concern:*

Be it known that I, CHARLES ROBERT MAYO, a subject of the King of Great Britain, residing at Aldermans House, Bishopsgate, in the city of London, England, have invented a new and useful Method of Extracting Grease from Grease-Bearing Materials; and the application is a division of my application filed April 8, 1910, Serial No. 554,176, of which the following is a specification.

The present invention relates to a method of, extracting grease and similar matter from and for treating wool, skins, textiles and other materials.

The art of extraction of grease, commonly known as degreasing, has been practiced for a number of years, and it has long been recognized that systems working under reduced pressure offer advantages in the way of distilling at low temperatures, and so on, and such systems have comprised extractors, stills and condensers interconnected in various ways and adapted to be placed under reduced pressure or vacuum; also it has been recognized that it is advantageous to displace the solvent which is heavily laden with grease, and cause it to overflow from the extractor into a still or vessel in which the solvent is to be distilled off from the grease.

Now, according to this invention, the vacuum principle is applied to a plant comprising an extractor or degreasing vessel, arranged so as to allow the contents to decant or overflow into the upper end of a still or grease collector, which latter is connected to a condenser, and for this purpose a suction or vacuum pump is connected to the condenser, and draws off from the extractor still and condenser any air which is present at the commencement of operations, or which may accumulate in the plant, or be admitted thereto, from time to time, so that a partial or complete vacuum is constantly maintained by the pump. Of course, if there be one or more series of extractors the last member of a series would overflow into the still.

A further feature of the present invention, which may be regarded as subsidiary to the foregoing principal improvement, consists in passing the condensed solvent down through or into a column of liquid, the suction of the pump being applied to the space above the column. The pump may deliver into a scrubber, either directly, in the known manner, or indirectly, as, for instance, by interposing between the pump and the scrubber a compression or air vessel in which the increased pressure to which the small traces of solvent vapors are subjected, overcomes the vapor tension, and causes the vapors to condense in the form of dew, thereby facilitating the action of the scrubber.

These features, and the complete method embodying such features, will be hereinafter particularly described with reference to the accompanying drawings in which:—

Figure 2:
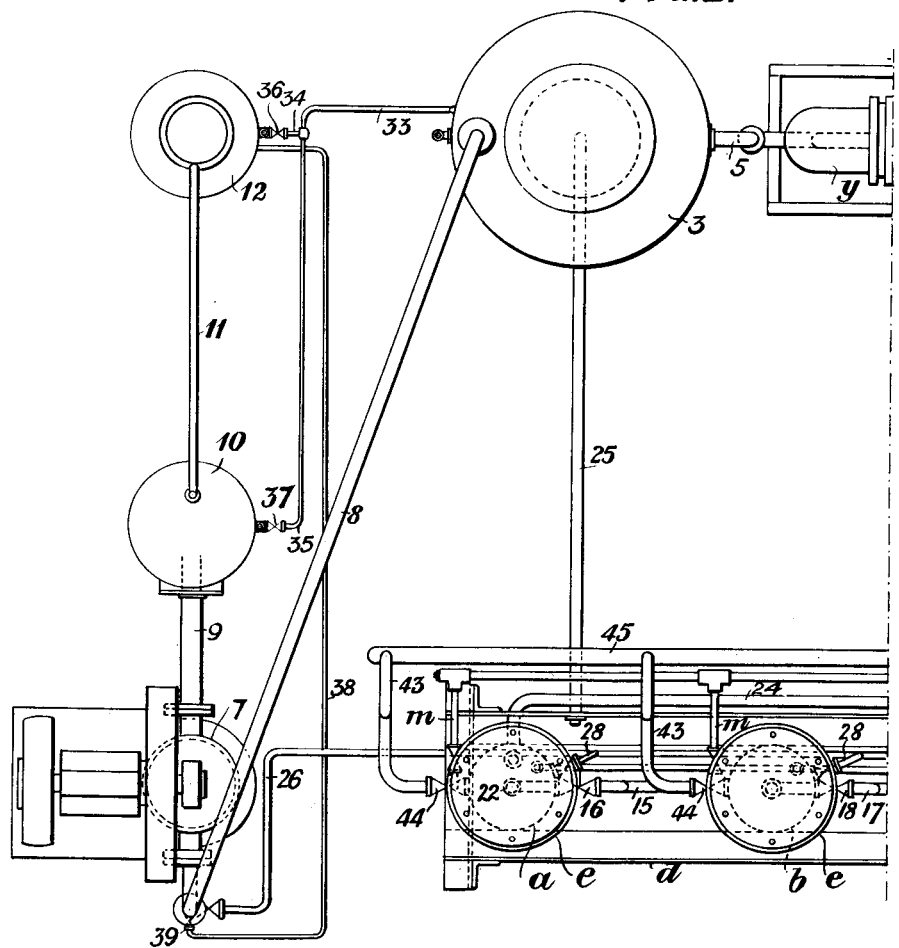

Figures 1 and 1ª represent a side elevation, partly in vertical section of a plant for performing the method embodying all of the features above referred to. Figs. 2 and 2ª represent a plan of Figs. 1 and 1ª; and Fig. 3 is an end elevation of the pump, air vessel and scrubber seen to the left-hand side of Fig. 1.

The description will be directed first of all more particularly to the construction and arrangement of the pieces of apparatus, afterward their connections will be described, and lastly the carrying out of a degreasing operation with the apparatus according to the improved method.

There may be any convenient number of extractors or degreasing vessels, but three are shown in the drawings, and these are indicated respectively by the reference letters *a, b, c*. The vessel *a* is shown in vertical section in Fig. 1, and as all of the vessels *a, b*, and *c* are alike, a description of the vessel *a* equally applies to the vessels *b* and *c*. The vessel *a* is conveniently cylindrical, and stands upon a base *d*, being shown fitted around a central thickened portion of the base *d*. A second cylinder *e* is fitted around the periphery of the base *d*, and is shown as being about two-thirds of the height of the vessel *a*. The annular space *f*, between the vessel *a* and cylinder *e* is filled with liquid, so as to constitute a heating jacket for the vessel *a*. A cover *g*, capable of being fitted gas-tightly upon the vessel *a*, carries a suitable vacuum gage *h*, and may be secured in position by the clamping bolts *j*, seen only on the vessels *b* and *c*, the hooked ends of which take under, say, a ring *k*, fixed around the upper end or rim of the vessel *a*. The vessels *a*, *b* and *c* may stand upon a bench or framing *l*. The liquid in the jackets $f$ may be kept at an even temperature by admitting steam thereto by branch pipes $m$ connected with the steam pipe $n$, the branches $m$ being shown immersed in the liquid, and reaching almost to the bottom of the jacket space $f$.

The still or grease collector $o$ is somewhat similar in construction to the extractors, as it comprises a base $p$, an outer cylinder $q$ inclosing a jacket space $r$ in the liquid, within which a steam emission pipe $s$ is immersed. The pipe $s$ is connected with the steam pipe $n$ aforesaid through a coil $t$, and branch pipe $u$, the heat from the coil $t$ serving to distil off the solvent as hereinafter explained. The still $o$ is shown supported upon an extension $v$ of the bench or framing $l$, and is also provided with a cover $w$ and gage $x$.

The condenser comprises a coil $y$ which may be formed of corrugated metal or otherwise in order to give a large cooling surface, and there may be a spray pipe $z$ designed to project numerous sprays upward on to the interior of a roof-shaped baffle 1, from which the liquid drips down on to the coil $y$, and cools the latter in known manner. A vacuum gage 2 may be fitted to the uppermost pipe of the coil $y$ as shown. The condenser further comprises a closed vessel 3, containing a column of liquid, such as water, and a pipe 4, passing downward through the liquid column and opening near the bottom of the latter, the pipe 4 being connected by means of the pipe 5 with the discharge orifice of the condenser coil $y$. If desired the length of the pipe 4 which is immersed in the column of liquid may be such that it will have a very considerable condensing action and in fact it might be arranged for all of the condensing action to take place beneath the surface of the liquid column. At the lower end the vessel 3 opens into a vessel 6, which may be the reservoir for the carbon bisulfid or other solvent, and such solvent being heavier than water remains beneath the water column, and is sealed by the latter. It is to be noted that the pipe 4 does not pass down to the reservoir 6, but only to near the bottom of the vessel 3, so that any air sucked from the condenser is not delivered into solvent, but only into the water in the vessel 3.

The suction or vacuum pump 7 is connected by the pipe 8 with the condenser vessel 3, above the column of liquid, and the pump is preferably of that kind which is continuously driven and maintains a constantly uniform degree of vacuum in the apparatus, so that the said pump only does actual work whenever there has been an admission of air to the apparatus. The delivery pipe 9 of the pump is led into a closed chamber 10, and an inverted U-shaped pipe 11 opens at one end into the chamber 10, near to the bottom of the latter and at the opposite end near to the bottom of a column of scrubbing liquid, which may be water, contained in the vessel 12. A cock or valve 13 is fitted on the pipe 11, so that by adjusting this valve any desired degree of compression can be obtained in the vessel 10. Also the pipe 8 may be fitted with a valve 14 and the pipe 5 with a valve 115. A back pressure valve 114 may also be fitted on the pipe 5 above the valve 115.

The extracting or degreasing vessel $a$ is connected at its upper end by an overflow pipe 15 with the lower end of the vessel $b$, a cock 16 being fitted on the pipe 15; the vessel $b$ is similarly connected with the vessel $c$ by pipe 17 fitted with cock 18. The vessel $c$ is connected by an overflow pipe 19 to a point near to the top of the still or grease collector $o$ and the pipe 19 has a control cock 20. All of the overflow pipes 15, 17, and 19, lead from a point a short distance from the tops of the respective vessels.

At their lower ends the extractors $a$, $b$, $c$, are connected to a common pipe 21 through the cocks 22, and by suitably manipulating the latter, any two, or all three vessels, can be placed in communication with one another. The T-connection 23 for the overflow valve 20 on the vessel $c$ is connected by a pipe 24 with the vessel $a$ through a cock 240 attached to the rear of the connection 23. The pipe 21 is connected by a pipe 25 (having a cock 250 therein) with the reservoir 6. A pipe 26 is connected with the pipe 8 and branches 27 thereupon are connected with the upper ends of the extractors or degreasing vessels $a$, $b$, $c$, each branch 27 having a cock 28. There may also be a cock 40 on the pipe 26 near to the pump. An air or steam pipe 29 has branches 30 connecting with the bottoms of the extractors $a$, $b$, $c$, each branch being fitted with a cock 31.

The spray pipe $z$ has connected to it a water supply pipe 32. A pipe 33, leading from the condenser vessel 3, and having a branch connection 34 to the scrubbing vessel 12, and a second connection 35 with the air vessel 10 enables a transference of liquid from one vessel to the other under control of the cocks 36 and 37 on the branches 34 and 35 respectively. A pipe 38 is connected between the scrubber 12 and the suction pipe 8, and communication through this pipe can be opened by the cock 39 thereon.

A gage glass 41, is fitted to the vessel 3, to enable the height of the liquid column to be observed. Gage glasses 42 Fig. 1, may be fitted to the lower ends of the air vessel 10 and scrubber 12, to enable the height of any accumulation of solvent in these vessels to be observed.

Each of the vessels $a$, $b$ and $c$, and also the vessel $o$, has communication through branch pipes 43 fitted with valves 44, with a pipe 45, leading to the upper end of the condenser coil y.

At the commencement of operations the vessels a, b, c and o may all be empty, and if this is the case the vessels a, b and c are each charged with wool, or other material from which grease is to be extracted, to about the height shown in the vessel a in Fig. 1. The covers g of the vessels a, b and c are now clamped down, also the cover w of vessel o, if the last-named cover has been removed. All of the valves might be closed except the valves 28 and 40, and these being opened, and the pump set to work the vessels a, b and c would be exhausted, and if meanwhile steam be admitted to the jackets f by the pipes m, the contents of the vessels a, b, and c becoming heated would give up any moisture which they contained, and the vapors would be drawn off by the pump. The cocks 28 and 40 may now be closed, and the cocks 14, 115, 44, 20, 18 and 16 opened so that the pump 7 will now exhaust the vessel 3, the pipes 4 and 5, the coil y, the pipes 45 and 43, and the vessels o, c, b and a. When a sufficient degree of vacuum has been obtained the cock 22 of the vessel a, and the cock 250 in the pipe 25 are opened and grease solvent from the reservoir 6 is permitted to flow under gravity or due to the head of water in the vessel 3, through the pipes 25 and 21, into the vessel a, until the contents of the vessel are submerged by the solvent. When a fresh charge of solvent is permitted to flow from the reservoir 6 into the vessel a, and drives before it the charge already in a, this charge enters the vessel b by the pipe 15 and submerges the contents of b. When another fresh charge of solvent flows into a, the charge in the vessel b will be displaced, and will overflow by the pipe 17 into vessel c, and this, being now a solvent heavily laden with grease, is allowed to overflow into the vessel o by the pipe 19, when yet another fresh charge of solvent flows from the reservoir 6 into the vessel a, driving before it the charge already in a, which will enter b, as aforesaid. If preferred, however, instead of admitting a fourth charge to vessel a, the cocks 250 and 16 can be closed, and the cock 22 on the vessel b opened. On warming the water jacket of the vessel a, pressure will be generated, and the solvent forced over from a through the pipe 21 to the vessel b, displacing the charge in b to c, and that in c to o, as aforesaid. If the coil t in the vessel o has live steam passing through it the grease-laden solvent will be distilled, the solvent evaporated being drawn off into the condenser coil y, where it is condensed, and passing as a liquid from thence through pipe 5, down the pipe 4, in the vessel 3, to the reservoir 6, beneath the column of water in the vessel 3. When a third charge of solvent is admitted to a the charge first admitted to a will be found in c, and as the third charge to a (or of course, it might be the fourth) will be very little contaminated with grease, it may be returned to the reservoir 6. To do this all of the cocks on the vessel a may be closed, except the cock 22. Under these circumstances the vessel a being warmed by its jacket, quickly generates pressure, which drives the solvent from a back into the reservoir 6. The cock 22 is then closed and the cock 44 opened, and the vapors from the solvent still clinging to the now degreased matter in a will be drawn off through the condenser. After a time the cock 44 to a may be closed, and the air or steam, or steam and air cock 31, and the suction cock 28, may be opened, and a deodorizing current of air, or steam, or steam and air be passed through the degreased matter, such current being drawn off by the pump 7, and passed through the air vessel 10, and scrubber 12 as hereinafter explained. After closing all of the cocks on the vessel a, the latter may be opened and the degreased matter removed, and a fresh charge of greasy material may be introduced. The charge of solvent which was first in a, and is now in c, may, after the exhaustion of the vessel a, through its cock 28, as before, be re-admitted to a by closing the cocks 20 and 44 on the vessel c and the cock 18 on the vessel b, and opening the cock 240 on the pipe 24, and the cocks 22 beneath b and c, for when this has been done the pressure which will be generated in the vessel b through the warming of the water jacket will drive the solvent from the vessel b through the pipe 21 into the vessel c, and the contents of the vessel c will then overflow through the pipe 24 into the vessel a. The cock 22 on the vessel b may now be closed, and the contents in the vessel b may be freed from the remaining solvent and deodorized in the manner just previously described with reference to the vessel a. After this, the degreased material is removed from the vessel b, and the latter receives a fresh charge of material, and after closing and exhausting the vessel b, the solvent from the vessel a may be driven into the vessel b, by opening the cock 16, and the cocks 22 beneath the vessels a and c, and closing all other cocks except cock 44 on the vessel b, so that the pressure which is then generated in c drives the solvent into a and the contents of the vessel a overflow into b. The vessel c, after being freed from the remaining solvent, as above described, may now be opened in order to remove its contents, and to give it a fresh charge, the same procedure being observed as described with reference to the vessels a and b. It will be understood that it is very easy, before transferring solvent from the vessel c to the vessel a, or from c to b, to cause to overflow into the vessel o the upper layers of solvent laden with grease, and to transfer only the lower layers of comparatively grease-free solvent. It will also be observed that when in regular work, one charge only is caused to overflow into the vessel o in each cycle. As the grease-laden solvent flows into the still o, it is evaporated and led off to the condenser, the pressure in the latter being lower, due to the condensation constantly taking place. It will be readily recognized that the pump has very little work to do owing to this fact, and that the pump is only required to suck out air which has leaked into the apparatus, or which has been admitted when opening one of the extractors a, b, or c. The pressure of the atmosphere being greater than the normal pressure within the apparatus, or, at any rate, within that part of the apparatus which represents the closed circuit of the solvent, the tendency is for air to leak into the apparatus, and the solvent vapors cannot, therefore, leak out.

The grease which collects within the vessel o may be drawn off from time to time, or as desired through the draw-off cock 46. If desired, the vessel o may be provided with baffles for the grease-laden solvent or emulsion to flow over, or with other devices of known character designed to facilitate the liberation of the solvent vapors from the grease.

Any air passing into the condenser coil y will pass with the vapors and liquid through the pipes 5 and 4, and whereas the solvent will remain beneath the column of water in the vessel 3, the solvent being heavier than water, the air will rise through the water, and will be sucked off through the pipe 8. It will be noticed that the column of water in the vessel 3 not only serves to seal off the solvent contained in the reservoir 6, but also serves to provide a considerable head, which will force the solvent as quickly as desired into the extractors when the cocks 250 and 22 are opened. If preferred, however, the reservoir 6 might be detached from the vessel 3, and might have its own column of water for sealing and pressure purposes, and in that case the space above the water could be in communication with the suction pipe 8, so that the whole system would still retain its low pressure characteristic, and all solvent would be water sealed.

Referring now more particularly to Fig. 3, it may be explained that should the pump draw off any air from the apparatus, as aforesaid, such air in most cases will bear slight traces of solvent vapors which are very difficult to extract and remove from such air, the retention of these last traces being due to vapor tension. In order to effectually remove these last traces the delivery of air from the pump 7, instead of being taken to the scrubber directly, is first passed through the pipe 9 into the chamber 10. The mouth of the delivery pipe 9 may be downwardly directed in the chamber, as shown, and the chamber 10 may contain a column of water chiefly intended for sealing off any solvent which may be deposited. The vessel 10 may, of course, be fitted with a solvent draw-off cock and a gage. Pressure is set up in the chamber 10, due to entry of any air from the pump, and this pressure can be regulated as desired by closing or adjusting the cock 13, so that the pressure varies in accordance with the freedom of escape from the chamber 10. The pressure thus set up in the chamber 10 releases practically all of the last traces of solvent which are deposited in the form of dew, and any traces not so deposited will pass on to the scrubber through the pipe 11. If desired the pressure in the chamber may be increased by the assistance of other means, for instance, by the admission of water under pressure to the chamber while the valve 13 is closed or partly closed.

The lower end of the pipe 11 in the scrubber may be fitted, if desired, with a perforated rose, or ring, or spray nozzle, and the scrubber may be fitted with baffles in order to cause the ascending air-bubbles to perform a tortuous course. If the air, after being compressed in the vessel 10, be allowed to stand therein for a time so that its temperature becomes reduced, owing, say, to radiation of heat from the walls of the chamber, then, upon opening the cock 13, the air will suddenly expand into the scrubber, the temperature will be still further reduced, and the condensation of solvent vapors will be expedited; also the temperature of the scrubbing liquid will be kept low, and will not be raised, as it otherwise might be, due to the heat given out in compressing the air.

What I claim and desire to secure by Letters Patent of the United States is:—

1. The method of degreasing grease laden materials which consists in subjecting them to a reduced pressure, supplying a solvent to the material, displacing the solvent when grease laden and discharging same into a still by further supply of solvent to said material, separating the solvent from the grease by distillation, condensing the distilled vapors, delivering gases, uncondensed vapors and products of condensation to a column of liquid sucking away uncondensed vapors and gases escaping from said column and treating such vapors and gases for the recovery therefrom of the last traces of solvent vapor.

2. The method of degreasing grease laden materials which consists in subjecting them to a reduced pressure, supplying a solvent to the material, displacing the solvent when grease laden and discharging same into a still by further supply of solvent to said material, separating the solvent from the grease by distillation, condensing the distilled vapors, delivering gases, uncondensed vapors and the products of condensation to a column of liquid maintained on a body of solvent, maintaining reduced pressure above said column in order to suck away uncondensed gases and vapors escaping from said column and treating such vapors and gases for the recovery therefrom of the last traces of solvent vapor.

3. The method of degreasing grease laden materials which consists in subjecting them to a reduced pressure, supplying a solvent to the material, displacing the solvent when grease laden and discharging same into a still by further supply of solvent to said material, separating the solvent from the grease by distillation, condensing the distilled vapors, drawing gases, uncondensed vapors and the products of condensation down through a portion of a column of liquid, admitting said gases, vapors and products to said column at a point above the base of the latter, sucking away uncondensed vapors and gases rising through and escaping at the top of said column and treating such vapors and gases for the recovery therefrom of the last traces of solvent vapor.

4. The method of degreasing grease laden materials which consists in subjecting them to a reduced pressure, supplying a solvent to the material, displacing the solvent when grease laden and discharging same into a still by further supply of solvent to said material, separating the solvent from the grease by distillation, condensing the distilled vapors, drawing gases, uncondensed vapors and the products of distillation down through a portion of a column of less specific gravity than said solvent, admitting said gases, vapors and products to said column at a point above the base of the latter, sucking uncondensed gases and vapors through said column, treating such gases and vapors for the recovery therefrom of the last traces of solvent vapors and maintaining said column at such a height as to provide an adequate head for effecting said displacement, substantially as set forth.

5. The method of degreasing grease laden materials, which consists in subjecting them to a reduced pressure, supplying a solvent to the material to extract the grease therefrom, drawing off the resultant emulsion, distilling the latter, condensing the distilled vapors, drawing off the uncondensed gases and volatile products during extraction, distillation and condensation, and subjecting the drawn off products to compression.

6. The method of degreasing grease laden materials, which consists in subjecting them to a reduced pressure, supplying a solvent to the material to extract the grease therefrom, drawing off the resultant emulsion, distilling the latter, condensing the distilled vapors, drawing off the uncondensed gases and volatile products during extraction, distillation and condensation, subjecting the drawn off products to compression, and passing the compressed products through a column of liquid.

7. The method of degreasing grease laden materials which consists in heating the material, drawing off the vapor therefrom, subjecting the material to a vacuum, passing a solvent through the material to extract the grease therefrom, drawing off the resultant emulsion, distilling the latter, condensing the distilled vapors, drawing the products of condensation through a liquid seal of less specific gravity than the solvent, admitting said products to said seal below the top of the latter, maintaining an adequate head above the solvent to drive the latter onto the material, drawing off the uncondensed gases and volatile products during extraction, distillation and condensation, compressing the drawn off products, and passing the compressed products through a column of liquid.

In testimony whereof I have signed my name to this specification in the presence of two subscribing witnesses.

CHARLES ROBERT MAYO.

Witnesses:
W. MORBEY,
H. D. JAMESON.